United States Patent
Bakker et al.

(10) Patent No.: US 7,817,268 B2
(45) Date of Patent: Oct. 19, 2010

(54) ALIGNMENT SYSTEM FOR SPECTROSCOPIC ANALYSIS

(75) Inventors: Bernardus Leonardus Gerardus Bakker, Eindhoven (NL); Michael Cornelis Van Beek, Eindhoven (NL); Gérald Lucassen, Eindhoven (NL); Marjolein Van Der Voort, Eindhoven (NL); Wouter Harry Jacinth Rensen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 659 days.

(21) Appl. No.: 11/574,161

(22) PCT Filed: Aug. 24, 2005

(86) PCT No.: PCT/IB2005/052767
§ 371 (c)(1),
(2), (4) Date: Sep. 4, 2007

(87) PCT Pub. No.: WO2006/021929
PCT Pub. Date: Mar. 2, 2006

(65) Prior Publication Data
US 2008/0129991 A1  Jun. 5, 2008

(30) Foreign Application Priority Data
Aug. 27, 2004  (EP) .................................. 04104124

(51) Int. Cl.
*G01J 3/30* (2006.01)
(52) U.S. Cl. ........................ 356/317; 356/301; 356/318; 356/329; 250/201.1

(58) Field of Classification Search ......... 356/300–334, 356/417; 250/201.1, 458.1–461.2
See application file for complete search history.

(56) References Cited

U.S. PATENT DOCUMENTS

| | | | | |
|---|---|---|---|---|
| 3,762,821 | A | * 10/1973 | Bruning et al. | ........ 356/139.07 |
| 4,357,079 | A | 11/1982 | Karasawa | |
| 4,480,913 | A | 11/1984 | Dukes et al. | |
| 5,373,359 | A | 12/1994 | Woollam et al. | |
| 6,352,502 | B1 | 3/2002 | Chaiken et al. | |
| 6,661,509 | B2 | 12/2003 | Deck et al. | |
| 6,765,609 | B1 | * 7/2004 | Kinoshita | ................ 348/222.1 |
| 6,982,792 | B1 | * 1/2006 | Woollam et al. | ............ 356/369 |

FOREIGN PATENT DOCUMENTS

| | | |
|---|---|---|
| JP | 03277932 A | 12/1991 |
| JP | 04024538 A | 1/1992 |
| JP | 04036642 A | 2/1992 |
| WO | 02057758 A1 | 7/2002 |

\* cited by examiner

*Primary Examiner*—Tarifur Chowdhury
*Assistant Examiner*—Michael LaPage

(57) ABSTRACT

The present invention provides a spectroscopic system as well as a method of autonomous tuning of a spectroscopic system and a corresponding computer program product. By detecting the position of return radiation in a transverse plane of an aperture of a spectroscopic analysis unit, a control signal can be generated that allows to drive servo driven translation or tilting stages of optical components. In this way a transverse misalignment of a spectroscopic system can be effectively detected. Generally, a plurality of different detection schemes are realizable allowing for an autonomous tuning of the spectroscopic system and for autonomous elimination of misalignment of a spectroscopic system.

12 Claims, 5 Drawing Sheets

ALIGNMENT SYSTEM FOR SPECTROSCOPIC ANALYSIS

FIELD OF THE INVENTION

The present invention relates to the field of optical spectroscopy and in particular without limitation to alignment of optical beams in spectroscopic analysis systems.

BACKGROUND OF THE INVENTION

Usage of optical spectroscopy techniques for analytical purposes is as such known from the prior art. For example WO 02/057 758 A1 shows spectroscopic analysis apparatus for in vivo non-invasive spectroscopic analysis of the composition of blood flowing through a capillary vessel of a patient. Here, the position of a distinct capillary vessel is determined by an imaging system in order to identify a region of interest to which an excitation beam for the spectroscopic analysis has to be directed. Typically, imaging as well as the spectroscopic analysis both make use of a common microscope objective enabling imaging of a capillary vessel on the one hand and allowing for focusing of a near infrared (NIR) laser beam into the skin for exciting a Raman spectrum on the other hand. Moreover, the same microscope objective is used for collection of the scattered radiation evolving from the Raman process.

In particular, by making use of a high-numerical-aperture objective and a pinhole in front of the detector, Raman spectra can be taken from a small, confocal detection volume. However, capillary vessels in the skin being detected by the imaging system can either be located on the optical axis of the microscope objective or can be located off axis. In the latter case and due to the fact, that the confocal detection volume of the spectroscopic analysis system is rather small, the Raman detection volume has to be shifted into a selected volume of interest covering at least a part of a capillary vessel that is typically located at a certain depth underneath the surface of the skin of a patient.

In order to obtain an appreciable spectroscopic signal not only the excitation beam has to be properly directed or focused into a selected capillary vessel but also spectrally shifted return radiation has to be appropriately collected and efficiently provided to a spectroscopic unit, e.g. a spectrometer.

In typical confocal arrangements the focal spot of the excitation beam features a diameter in the range of a few micrometers and the corresponding focal spot of the collected return radiation might be enlarged by a factor of ten. Typically, the spectroscopic unit has an entrance aperture that is several tens of micrometers in diameter. Hence, efficient spectroscopic analysis requires a substantial overlap between the confined return radiation and the entrance aperture of the spectroscopic unit of the spectroscopic system. Therefore, the confined return radiation has to be precisely aligned.

In confocal arrangements the diameter of the confined return radiation has to correspond to the dimensions of the aperture of the spectrometer. Because the size of the focal spots and/or the aperture are in the micrometer range, deviations and misalignment may easily occur due to e.g. varying environmental conditions like varying temperature and due to mechanical imperfections of any fixing or mounting means for various optical components of a spectroscopic systems. Typically, any misalignment or mismatch between the confined spectroscopic signal and the aperture of the spectrometer has to be eliminated by manually adjusting and aligning the optical paths of the spectroscopic system. Manual alignment of optical paths of a spectroscopic system is rather cumbersome and does not allow for a commercial distribution to an end consumer.

The document U.S. Pat. No. 6,352,502 B1 discloses a method and apparatus for obtaining feedback to drive a servo system for aligning and maintaining alignment in optical systems that bring light to an in vivo skin sample. This method comprises irradiating a tissue of interest in a subject with light having an excitation wavelength and that passes from a light source through a first adjustable lens, and passing spectra that are emitted by the tissue through a second adjustable lens. The spectra that are passed through the second adjustable lens are then collected and analyzed to determine a target signal associated with an analyte of interest. The method further comprises deriving a correction signal from the target signal and adjusting the position of the first adjustable lens or the second adjustable lens on the basis of the correction signal so as to enhance the target signal.

The method disclosed in U.S. Pat. No. 6,352,502 B1 derives a correction signal from a target signal, wherein the target signal is determined by analyzing collected spectra. In extreme situations where a collected spectrum does by no means enter a spectroscopic unit because of severe misalignment, no target and/or correction signal can be obtained or determined. In such extreme cases, the method and apparatus disclosed in U.S. Pat. No. 6,352,502 might not be able to appropriately enhance the target signal. Moreover, the disclosed apparatus makes use of a first and a second adjustable lens that are dedicated for directing radiation towards the sample and for collecting return radiation, respectively.

The present invention therefore aims to provide an improved alignment of return radiation collected by an optical arrangement of a spectroscopic system.

SUMMARY OF THE INVENTION

The invention provides a spectroscopic system for determining of a property of a substance in a volume of interest. The inventive spectroscopic system comprises an optical arrangement for focusing an excitation radiation into the volume of interest and for collecting return radiation from the volume of interest. The spectroscopic system further comprises alignment means for directing at least a portion of the return radiation into an aperture of a spectroscopic unit of the spectroscopic system and a spatial light detector for detecting the transverse position of the return radiation in a transverse plane. Typically, this transverse plane comprises the aperture of the spectroscopic unit.

Additionally, the spectroscopic system comprises a control unit that is adapted to control the alignment means in response to a processing of an output signal of the spatial light detector.

The optical arrangement for focusing the excitation radiation and for collecting the return radiation typically serves as a means for realizing a confocal optical arrangement, i.e. the excitation radiation is focused into the volume of interest and the return radiation emanating from the volume of interest is collected and focused into the aperture of the spectroscopic unit. The optical arrangement makes preferably use of a microscope objective as well as several beam splitters and mirrors. Preferably, excitation radiation generated by e.g. a near infrared (NIR) laser as well as collected return radiation propagate on the same optical path but in counter propagating directions. Also, the portion of the return radiation that is spectrally shifted with respect to the excitation radiation is typically filtered and/or spatially separated by making use of dichroic elements featuring different transmission and/or reflection properties for the excitation radiation and the frequency shifted portion of the return radiation that is for example indicative of a Raman spectrum of a substance that is located in the volume of interest.

The alignment means for directing at least a portion of the return radiation into an aperture of the spectroscopic unit might be implemented on the basis of servo driven alignment means. In this way alignment of the optical beams in the spectroscopic systems no longer has to be performed on the basis of manual adjustment of the various adjustable optical components. This allows for a higher precision as well as to modify the alignment on the basis of an electric control loop. Servo driven alignment may refer to any optical component of the spectroscopic system, such as e.g. the microscope objective, the dichroic elements, any mirrors, lenses or beam splitters of the spectroscopic system. Moreover, alignment may refer to a transversal shift in any direction or to an arbitrary rotation, i.e. a modification of the orientation of an optical component.

The spatial light detector serves to provide a feedback signal whenever the transverse position of the return radiation does not match with the position of the aperture of the spectroscopic unit. Hence, the spatial light detector is preferably implemented as a two dimensional detection array that allows to determine the transverse position of the return radiation in the transverse plane. This transverse plane is preferably defined as the aperture of the spectroscopic unit. For example, the aperture of the spectroscopic unit can be realized by a flexible optical fiber. Hence, the aperture of the spectroscopic unit does not necessarily have to coincide with a front facet of the spectroscopic unit.

The spatial light detector is preferably designed around the aperture of the spectroscopic unit. The spatial light detector can in principle be realized in many different ways, such as e.g. a split detector, a quadrant detector, a detector array with a plurality of pixels or even as a multiple fiber detector arrangement. When implemented as a split detector, the detector basically features two detector segments that are e.g. horizontally or vertically arranged. Whenever a portion of the return radiation is detected by any of the detector segments, this gives a clear indication that the spectroscopic system is subject to a misalignment. Making use of e.g. a split detector with two horizontally aligned detector segments, detection of a light intensity of the first detector segment gives a clear indication of a horizontal misalignment. Depending on whether the left or right detector segment detects a non-zero-light intensity, information is inherently obtained whether the misalignment is to the left or to the right of the aperture. Making use of e.g. a quadrant detector featuring four detection segments even allows to sufficiently determine vertical and horizontal misalignment of the spectroscopic system.

The control unit is finally adapted to process the output signals generated by the spatial light detector. In this way the type of misalignment can be precisely determined and the alignment means can be appropriately controlled by means of the control unit in order to eliminate the alignment mismatch. Preferably, the alignment means, the spatial light detector and the control unit form a control loop that autonomously serves to reduce any alignment mismatch within the spectroscopic system. Depending on the granularity of the spatial light detector not only a type of misalignment but also a magnitude of misalignment might be precisely determined. For example, when the granularity of the spatial light detector is rather low, such as the case with a quadrant detector, the control loop of detecting the transverse position of the return radiation, processing of the output signal of the spatial light detector and manipulating the alignment means may have to be iteratively performed in order to successively reduce the misalignment.

In the other case, when the spatial light detector features a sufficiently high granularity that allows for a precise determination of the magnitude of the misalignment, the alignment means might be sufficiently manipulated in a single step in order to eliminate the misalignment.

According to another preferred embodiment of the invention, the alignment means and the optical arrangement are adapted to confine the return radiation to a transverse circumference in the transverse plane. This transverse circumference has substantially the same dimension as the aperture of the spectroscopic unit. In this way a confocal optical arrangement can be effectively realized that allows for a precise selection of the position of the volume of interest along the optical axis. Preferably, such confocal arrangements are well suited for a longitudinal shift of a focal point and hence for a precise longitudinal positioning of the focal spot of the excitation radiation. The alignment means and the optical arrangement are even well suited for varying the transverse circumference of the return radiation in the transverse plane of the spectroscopic unit's aperture. In this way the transverse circumference of the return radiation can be effectively adjusted to the aperture of the spectroscopic unit.

According to a further preferred embodiment of the invention, the aperture of the spectroscopic unit comprises an aperture of an optical fiber. This optical fiber is further adapted to couple the return radiation into the spectroscopic unit. Since, the optical fiber typically provides a large flexibility and provides almost lossless transmission of optical radiation, the spectroscopic unit can even be installed at a remote location. In particular, by making use of an optical fiber as aperture of the spectroscopic unit, the spectroscopic unit no longer has to remain at a fixed position within the spectroscopic system.

Moreover, by coupling return radiation into the spectroscopic unit by means of an optical fiber, the spectroscopic unit can be implemented as an external module of the spectroscopic system. Hence, the spectroscopic unit might be shared by a plurality of various spectroscopic systems and/or might be located at some remote location. Making use of such an optical fiber it is only important, that the return radiation is effectively coupled into the aperture of the optical fiber. Any portion of the return radiation that is not coupled into the aperture of the optical fiber should be detected by means of the spatial light detector and may therefore serve as a basis for a control signal of the control unit for eliminating the alignment mismatch.

According to a further preferred embodiment of the invention, the alignment means are further adapted to move the position of the aperture of the spectroscopic unit in a plane perpendicular to the direction of propagation of the return radiation. In this embodiment, the alignment means not only serve to align optical components of the spectroscopic system, such like lenses, mirrors, dichroic elements, beam splitters or the objective but also allow to shift the aperture of the spectroscopic unit or to shift the entire spectroscopic unit itself. Moreover, in this embodiment shifting may refer to a translation in the transverse plane, i.e. in the plane perpendicular to the direction of propagation of the return radiation. For example, the spectroscopic unit might be mounted on a two dimensional translation stage that sufficiently allows for a translation in the transverse plane. Also, the optical fiber and/or some kind of light collecting means, like e.g. a lens, might be translated correspondingly along the direction of propagation of the return radiation. In this way the length of the optical path of the return radiation can be sufficiently modified.

According to a further preferred embodiment of the invention, the spatial light detector is further adapted to determine the size of the transverse circumference of the return radiation. In this way, not only a transverse misalignment of the return radiation can be determined but also a mismatch of the circumference of the confined return radiation with respect to the dimensions of the spectrometer's aperture. For example, when the transverse circumference of the return radiation is larger than the aperture of the spectroscopic unit, the spectroscopic system is no longer in an accurate confocal arrangement. This could even be detected when the spatial light detector is implemented on the basis of a split detector. If both light sensitive segments of the split detector detect a substantial light intensity, a clear indication will be given, that the transverse circumference of the return radiation well exceeds the aperture of the spectroscopic unit. However, for a precise determination of the transverse size of the circumference of the return radiation, an array detector with a high spatial transverse resolution is preferably implemented. In this way, also the absolute size of the transverse circumference of the return radiation can be precisely determined.

According to a further preferred embodiment of the invention, the alignment means are further adapted to modify the length of the optical path between the optical arrangement and the aperture of the spectroscopic unit. Hence, the optical path of the return radiation can be extended or shortened by means of the alignment means. A variation of the optical path length is preferably necessary, when the transverse circumference of the return radiation does not match the aperture of the spectroscopic unit. Hence, a mismatch in circumference is a clear indication that the optical path length has to be adjusted. Adjusting of the optical path length can be sufficiently realized by servo driven translation stages that allow to translate the spectroscopic unit, the optical arrangement and/or the objective of the spectroscopic system. Again instead of shifting the entire spectroscopic unit, also the optical fiber and/or a focusing lens for coupling of return radiation into the spectroscopic unit can become subject to a corresponding translation.

According to a further preferred embodiment of the invention, the alignment means comprise Piezo mechanical elements for tilting and translating the optical components of the spectroscopic system. This allows for a high precision and high performance steering of mirrors, translation stages, lenses, beam splitters and other optical components of the optical arrangement of the spectroscopic system. The Piezo mechanical elements might be implemented on the basis of Piezo ceramic actuators that generally provide higher forces than magnetic actuators as well as very high accelerations. In this way the Piezo mechanical elements allow for a fast and precise misalignment correction of the spectroscopic system.

According to a further preferred embodiment of the invention, the aperture of the spectroscopic unit is implemented into the spatial light detector. The spatial light detector may comprise a plurality of different detector types, such as a split detector, a quadrant detector, a detector array or an arrangement of multiple fibers that are arranged around a central fiber that serves as aperture of the spectroscopic unit. Preferably, the aperture of the spectroscopic unit is centrally incorporated into the spatial light detector. In this way position deviations to either side in the transverse plane can be effectively detected. By incorporating the aperture of the spectroscopic unit and the spatial light detector it is inherently guaranteed, that the confined return radiation is detected in the transverse plane of the spectroscopic unit's aperture.

According to a further preferred embodiment of the invention, the spectroscopic system further comprises a filter element, that is adapted to at least partially absorb or to reflect a spectral component of the return radiation that has substantially the same wavelength as the excitation radiation. This filter element is preferably mounted in front of the aperture of the spectroscopic unit. It might also be mounted in front of the spatial light detector. However, by locally mounting the filter element only in front of the spectroscopic unit's aperture, it can be effectively guaranteed that an appreciable portion of the return radiation is blocked from entering into the spectroscopic unit. Such a filtering is necessary because the return radiation typically comprises spectrally shifted radiation components as well as radiation components that remain spectrally not shifted with respect to the excitation radiation.

Preferably, for spectroscopic purposes, such as Raman spectroscopy, only a spectrally shifted portion of the return radiation, hence inelastically scattered radiation provides sufficient information of the composition of a substance that is located in the volume of interest. Elastically scattered radiation, that may feature the same wavelength as the excitation radiation is inevitably present and may decrease the signal to noise ratio (SNR) of the entire spectroscopic system. Typically, the portion of elastically scattered radiation is much larger then the portion of in-elastically scattered enhance frequency shifted return radiation. By selectively mounting the filter element only in front of the aperture of the spectroscopic unit, misalignment detection but is performed on the basis of the spatial light detector arranged around the spectroscopic unit aperture can be performed on the basis of elastically as well as inelastically scattered return radiation. In this way, almost the complete intensity of the return radiation can be effectively exploited for alignment correction.

In another aspect, the invention provides a method of tuning of a spectroscopic system. The spectroscopic system is adapted to determine a property of a substance in a volume of interest and the spectroscopic system has an optical arrangement for focusing an excitation radiation into the volume of interest and for collecting return radiation emanating from the volume of interest. The inventive method of tuning the spectroscopic system comprises the steps of detecting the transverse position of the return radiation in a transverse plane by means of a spatial light detector. Preferably, the transverse plane comprises the aperture of the spectroscopic unit. After detecting this transverse position, the method further comprises controlling of alignment means for directing at least a portion of the return radiation into the aperture of the spectroscopic unit if the return radiation's transverse position does not centrally overlap with the aperture of the spectroscopic unit.

In a preferred embodiment, the method comprises confining the return radiation to a transverse circumference in the transverse plane, moving the position of the aperture of the spectroscopic unit in response to detect the transverse position of the confined returned radiation non-centrally overlapping with the aperture of the spectroscopic unit. In this way, a transverse mismatch of the position of the confined return radiation and the aperture of the spectroscopic unit can be effectively eliminated.

The method further comprises determining the size of the transverse circumference of the return radiation by means of the spatial light detector and modifying the length of the optical path between the optical arrangement and the aperture of the spectroscopic unit if the transverse size does not match the size of the aperture of the spectroscopic unit. In this way, the inventive method provides a universal misalignment correction of a spectroscopic system that accounts for a transverse position mismatch of an optical beam as well as for a mismatch of a return beam's transverse circumference.

In still another aspect the invention provides a computer program product for tuning of a spectroscopic system. The spectroscopic system is adapted to determine a property of a substance in a volume of interest and has an optical arrangement for focusing an excitation radiation into the volume of interest and for collecting return radiation from the volume of interest. The computer program product comprises computer program means that are adapted to determine the transverse position of the return radiation in a transverse plane on the basis of an output signal that is provided by a spatial light detector. The transverse plane comprises an aperture of a spectroscopic unit. Hence, the transverse plane is specified by the position of the spectroscopic unit's aperture along the optical axis of the spectroscopic system. The computer program product further comprises program means that are adapted to control alignment means of the spectroscopic system for directing at least a portion of the return radiation into the aperture of the spectroscopic unit if the return radiation's transverse position does not centrally overlap with the aperture of the spectroscopic unit.

Moreover, the computer program product might be further adapted to determine the transverse size of the circumference of the return radiation and to appropriately modify the length of the optical path between the optical arrangement and the aperture of the spectroscopic unit.

In this way, the invention provides a spectroscopic system and a method for an autonomous tuning thereof. A signal is generated by means of determining the transverse position and/or size of the return radiation which serves as a control signal. The control unit in combination with alignment means and computer program product therefore forms a control loop providing autonomous tuning of the spectroscopic system.

Further, it is to be noted, that any reference signs in the claims are not to be construed as limiting the scope of the present invention.

BRIEF DESCRIPTION OF THE DRAWINGS

In the following preferred embodiments of the invention will be described in detail by making reference to the drawings in which.

DETAILED DESCRIPTION OF THE PREFERRED EMBODIMENTS

Figure 1:
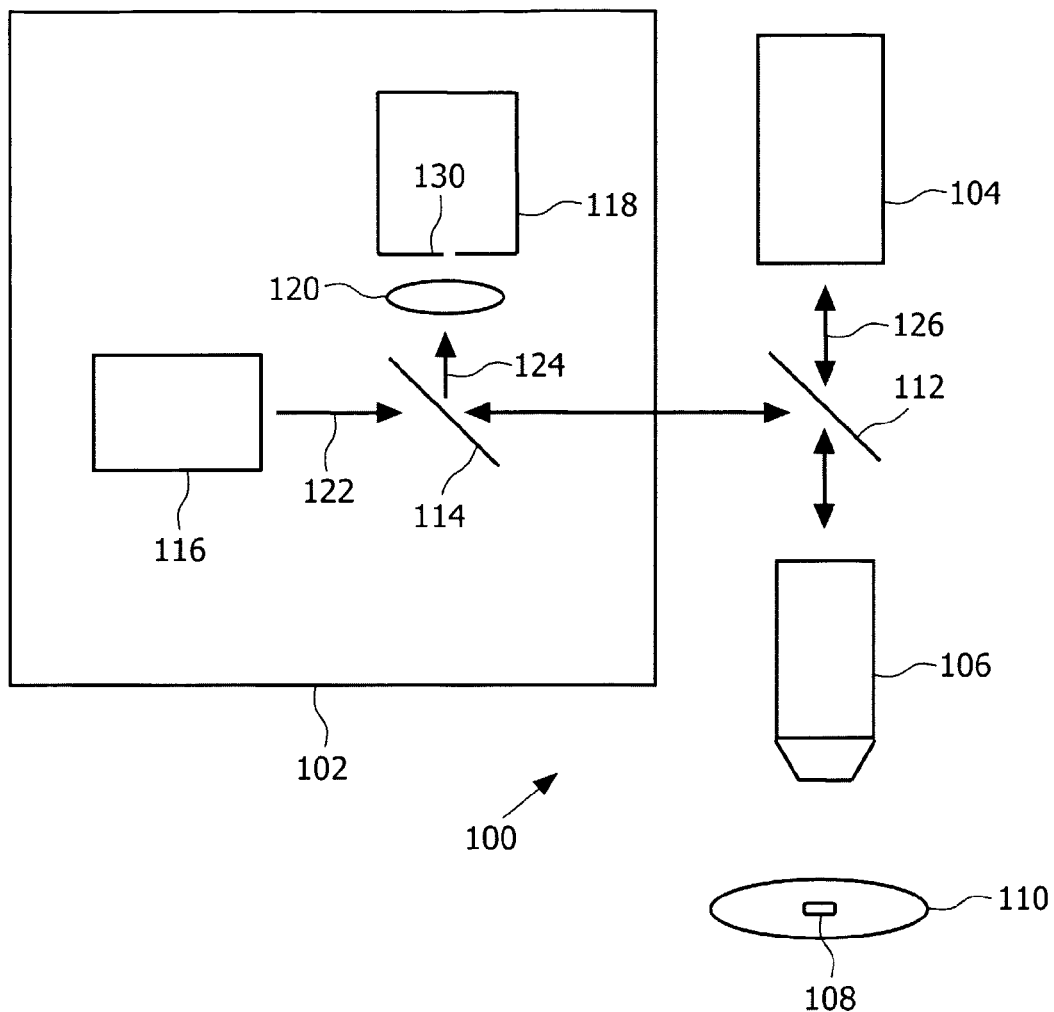
FIG. 1 schematically shows a block diagram of the spectroscopic system.

FIG. 1 schematically shows a block diagram of the spectroscopic system 100. The Spectroscopic system 100 has a spectroscopic unit 102, an imaging unit 104, an objective 106 and a beam splitter 112. The spectroscopic unit 102 has a laser light source 116, preferably emitting in the NIR range, a spectrometer 118, a dichroic mirror 114 as well as a lens 120. The illustrated configuration of the spectroscopic system 100 is by no means limited to the illustrated embodiment. For example, the laser 116 can be implemented as a separate module and does not necessarily have to be an internal component of the spectroscopic unit 102.

The inventive spectroscopic system 100 is preferably designed for spectroscopic analysis of a volume of interest 108 that is located in a sample 110. The sample 110 can be for example any biological tissue, like skin tissue of a person or an animal. The spectroscopic system 100 allows for a non-invasive analysis of the volume of interest. Hence, excitation radiation 122 is focused into the volume of interest 108 by means of the objective 106 and various optical components, such as the dichroic mirror 114 and the beam splitter 112. Typically, the excitation radiation 122 focused into the volume of interest 108 induces a plurality of scattering processes. The objective 106 serves to focus the excitation radiation 122 into the volume of interest 108 as well as to collect return radiation that stems from scattering processes of the excitation radiation 122 in the volume of interest 108.

Typically, at least a portion of the return radiation is frequency shifted due to inelastic scattering processes in the volume of interest, such like Raman scattering processes. This frequency shifted portion allows to spectrally analyze a substance that is located inside the volume of interest 108. Typically, the dichroic mirror 114 features a high reflectivity for the frequency shifted portions of the return radiation and therefore effectively allows to spatially separate spectroscopic relevant signals from elastically scattered radiation, that is due to e.g. Rayleigh scattering.

For example, when the sample 110 comprises human skin with blood vessels 108, the spectroscopic system effectively allows to determine the concentration of analytes of blood. These analytes might be for example: glucose, lactate, cholesterol, oxy-hemoglobin and/or desoxy-hemoglobin, glyco-hemoglobin (HbA1c), hematocrit, cholesterol (total, HDL, LDL), triglycerides, urea, albumin, creatinin, oxygenation, pH, bicarbonate and many others.

The imaging system 104 allows to track and to locate a blood capillary or a blood vessel 108 underneath the surface of the skin 110. Therefore, the imaging system 104 is adapted to emit as well as to detect imaging radiation 126 for generating a visual image of a region of interest around the volume of interest 108. When for example a distinct blood capillary has been located by means of the imaging system 104, the excitation radiation 122 can be precisely directed into the distinct blood vessel 108.

Apart from directing the excitation radiation 122 into the volume of interest 108, it has to be sufficiently guaranteed, that collected return radiation 124 is exactly incident on an aperture 130 of the spectrometer 118. In typical configurations, the focal spot of the excitation radiation 122 has a dimension in the range of a few micrometers. Since, the spectroscopic system 110 operates in a confocal arrangement, also the collected return radiation 124 has to be sufficiently focused into the aperture 130 of the spectrometer 118. Typically, a lens 120 provides a magnification of the return radiation's circumference by a factor. Suitable monitoring or imaging methods include Orthogonal Polarized Spectral Imaging (OPSI), Confocal Video Microscopy (CVM), Optical Coherence Tomography (OCT), Confocal Laser Scanning Microscopy (CLSM), Doppler Based Imaging and ultrasound based imaging.

The aperture 130 of the spectrometer 118 is surrounded by a detector that effectively allows to detect a misalignment of the return radiation 124. Typically, the circumference of the return radiation 124 substantially overlaps with the aperture 130. In such cases, where the return radiation 124 is perfectly coupled into the aperture 130, the surrounding detector may not provide a substantial output. However, when the return radiation 124 does not exactly hit the aperture 130, the detector may detect a significant intensity and may therefore generate an appropriate output that can be processed in order to tilt or translate any of the optical components 120, 114, 112, 106 of the spectroscopic system 100 in order to eliminate the detected misalignment.

Figure 2:
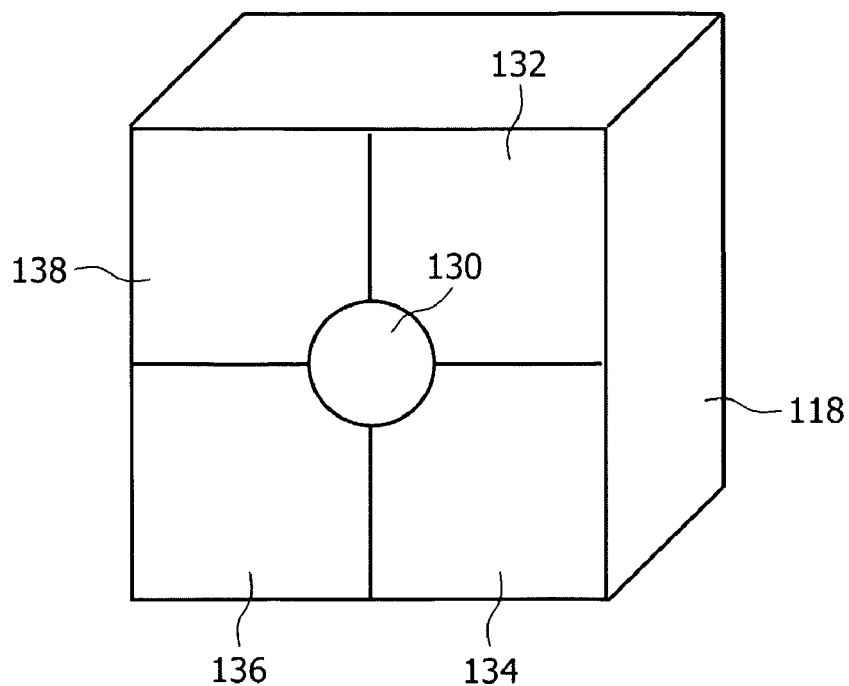
FIG. 2 shows the front face of the spectroscopic unit implemented as a quadrant detector.

FIG. 2 shows a perspective illustration of the spectrometer 118. Here, the front facet of the spectrometer 118 features an aperture 130 that is surrounded by four detection segments 132, 134, 136, 138 of the detector. Preferably, the aperture 130 is centrally located between the regularly arranged detection segments 132, . . . , 138. In this way, any misalignment of the collected return radiation can be sufficiently detected by any of the detection segments 132, . . . , 138. For example, when the incident return radiation is misaligned to the upper right, detection segment 132 will detect an appreciable light intensity and the corresponding detector output is inherently indicative of the type of misalignment. In another example, when detection segments 132 and 134 detect a substantially equal light intensity, this gives a clear indication that the return radiation 124 is horizontally shifted to the right with respect to the position of the aperture 130.

The quadrant detector illustrated in FIG. 2 is only one example of how to realize a spatial light detector. In principle also a basic embodiment is conceivable, where a split detector featuring only two detection segments can be implemented. In such a basic embodiment a misalignment correction is limited to one transverse direction, e.g. either horizontal, vertical or in a tilted way.

Additionally, the quadrant detector implemented by the four detection segments 132, . . . 138 does not necessarily have to cover the entire front facet of the spectrometer 118. For example, the spatial light detector may only cover a transverse section around the aperture 130 of the spectrometer 118. Moreover, since the aperture 130 might also be implemented on the basis of an optical fiber, the detection segments 132, . . . 138 do not necessarily have to be attached to the housing of the spectrometer 118. If the aperture 130 of the spectrometer 118 is implemented as an optical fiber, the spatial light detector and hence the four detection segments 132, . . . , 138 have to be arranged around the aperture of the optical fiber providing transmission of return radiation to the spectrometer 118.

Figure 3:
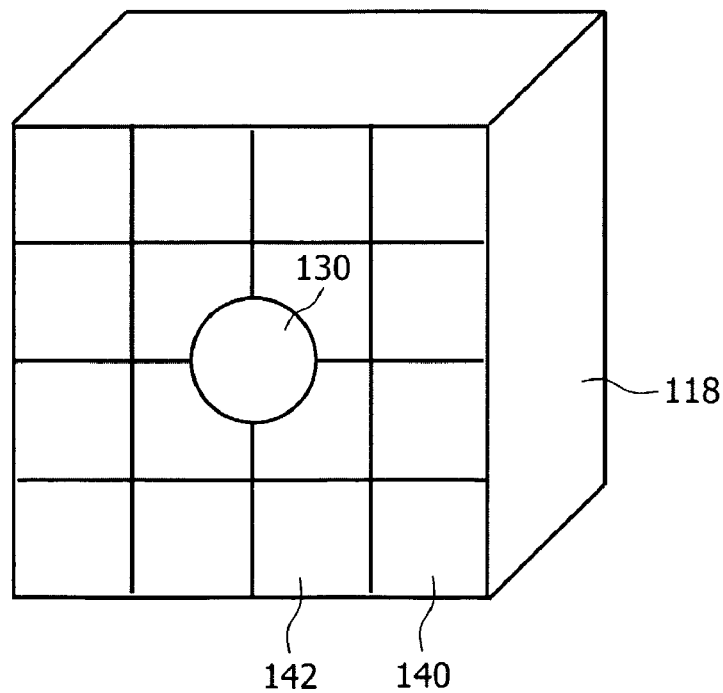
FIG. 3 shows the front face of the spectroscopic unit implemented as a detector array, FIG. 4 schematically shows an implementation of the spatial light detector on the basis of multiple optical fibers, FIG. 5 schematically depicts a side view illustration of the detector with a notch filter, FIG. 6 schematically shows a block diagram of the spectroscopic system in a misaligned configuration, FIG. 7 schematically shows misaligned return radiation on the front face of the spatial light detector.

FIG. 3 shows an alternative embodiment of the detector. In this embodiment, the detector is implemented as an array detector featuring a plurality of regularly arranged pixels, 140, 142, . . . . Also here, the aperture 130 is preferably centrally located and incorporated into the detector array. In the same way as already described with the embodiment of FIG. 2, the array detector does by no means have to cover the entire front facet of the spectrometer 118 neither does the array detector have to be an integral part of the housing of the spectrometer 118. When the array detector features a large number of detector pixels 140,142, i.e. providing a high granularity, not only the transverse position of the collected return radiation but also the circumference of the beam of the return radiation can be sufficiently determined. Since the size of the circumference of the return radiation beam is also indicative of the magnitude of misalignment, the detector output can therefore also be analyzed with respect to deviations in the return radiation beam' circumference.

Figure 4:
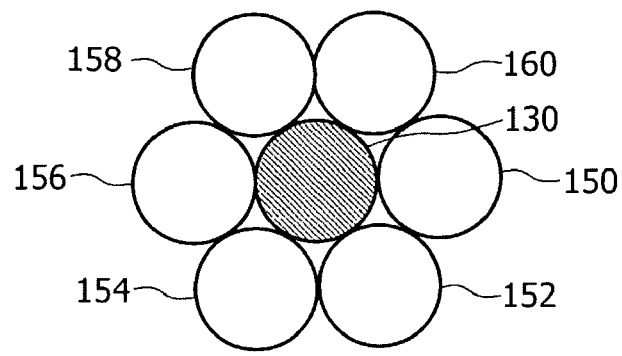

FIG. 4 shows an alternative embodiment of the light detector that comprises six misalignment optical fibers 150, 152, 154, 156, 158 and 160. These six misalignment fibers 150, . . . , 160 are regularly arranged around a central fiber 130 that serves as aperture of the spectrometer 118. Here, the misalignment fibers 150, . . . , 160 have the same function as the detection segments 132, . . . , 138 of the quadrant detector of FIG. 2 or the detection pixels 140, 142 of the array detector depicted in FIG. 3. Hence, any transverse position mismatch as well as size mismatch of the collected beam of return radiation can be detected by means of the misalignment fibers 150, . . . , 160 and allows for a sufficient misalignment compensation. Additionally, the distal end of the each one of the misalignment fibers is coupled to a corresponding misalignment detector that serves to determine the type and/or magnitude of a misalignment. Alternatively, the misalignment fibers might be coupled to a spectrometer, which allows to spectrally analyze the misaligned radiation. This also gives a control signal, that allows to tune and/or align the spectroscopic system.

Figure 5:
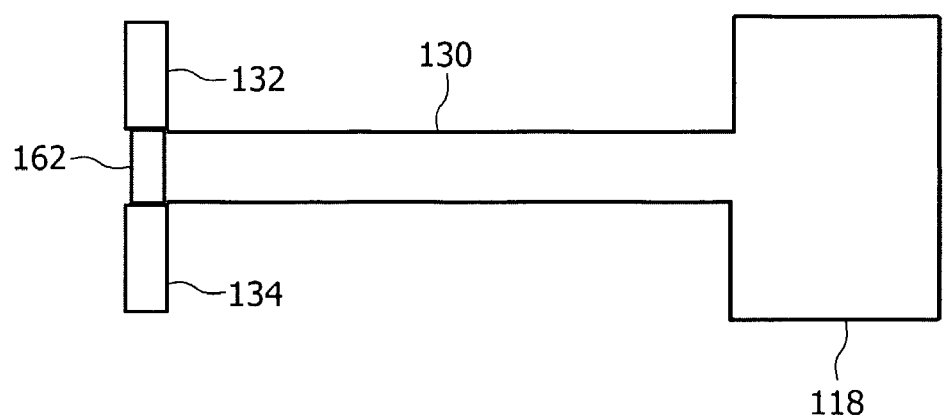

FIG. 5 schematically shows a cross sectional view of a quadrant detector of FIG. 2 in combination with an optical fiber 130 that serves as aperture of the spectrometer 118. The proximal end of the optical fiber 130 is incorporated into the quadrant detector whose detection segments 132, 134 are schematically shown. At its distal end, the optical fiber 130 is connected with the spectrometer 118. The optical fiber 130 effectively provides transmission of collected return radiation to the spectrometer 118 that can even be located at a remote location. In this way the flexibility of the entire spectroscopic system can be greatly enhanced. Additionally, a notch filter 162 is mounted in front of the aperture of the optical fiber 130. Preferably, the notch filter 162 serves to absorb or to reflect elastically scattered radiation of the return radiation and to transmit inelastically scattered radiation, the portion of the return radiation that is spectrally shifted with respect to the excitation radiation 122.

Making use of such a notch filter directly in front of the aperture 130, in principle the dichroic mirror 114 might be replaced by a conventional beam splitter. In this way, a major part of elastically as well as inelastically scattered radiation is directed towards the aperture 130 and towards the spectrometer 118. Typically, the elastically scattered portion of the return radiation features a larger intensity than the inelastically scattered portion. By directing inelastically scattered as well as elastically scattered radiation towards the spectrometer 118, the elastically scattered portion can be effectively exploited for the inventive misalignment compensation.

Implementing the spectrally selective notch filter 162 directly in front of the aperture 130 without covering any detection segment 132, 134 of the light detector, a major part of the return radiation can be effectively used for alignment purposes. In this way the detection segments 132, 134 do only have to provide a limited sensitivity that is sufficient for detection of elastically scattered portion of the return radiation.

Figure 6:
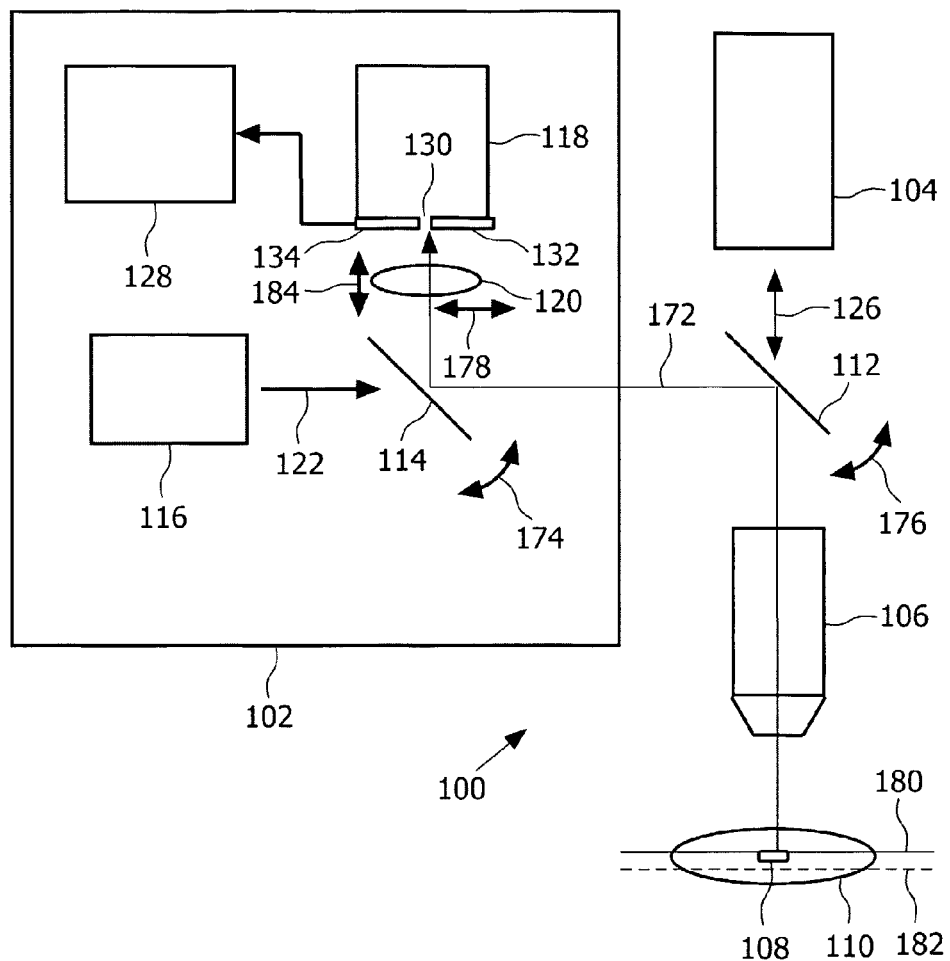

FIG. 6 schematically illustrates a block diagram of the spectroscopic system 100 with a misaligned correction optical arrangement. The optical axis 172 schematically shows where return radiation emanating from the volume of interest 108 is projected near the front facet of the spectrometer 118. For example, optical path 172 emanates from a central part of the volume of interest 108 but substantially hits the detection segment 134 instead of the aperture 130. This misalignment leads to a detection of an appreciable light intensity by means of the detection segment 134 that is further processed and classified by the control unit 128.

The control unit 128 in turn is adapted to appropriately manipulate the optical components 120, 114, 112, 106 of the spectroscopic system 100 in order to eliminate the detected misalignment. As indicated by the arrows 174, 176, 184 and 178 the optical components might be translated and/or tilted by means of electrically driven servo devices that are controlled by means of the control unit 128. For example, by slightly tilting the dichroic mirror 114 counter clockwise, the optical path 172 might exactly hit the aperture 130 of the spectrometer 118. Alternatively, when mounted on translation stages, the two mirrors or beam splitters 112, 114 might be simultaneously translated in order to horizontally shift the optical path 172 in the vicinity of the spectrometer 118.

Additionally, also the lens 120 might be shifted as indicated by the translation direction 178 and 184. Translating lens 120 in the direction indicated by the translation direction 178 as well as tilting of the mirrors or beam splitters 112, 114 along the tilting directions indicated by the arrows 174, 176, preferably the transverse position of the return radiation at the front face of the spectrometer 118 can be sufficiently modified. In this way the optical path can be shifted in the transverse plane in order to provide a sufficient overlap of the aperture 130 and the return radiation. Preferably, by scanning the position of the lens 120 and simultaneously monitoring the light intensity being transmitted through the aperture, an optimal position of the lens can be determined that corresponds to a maximum intensity being transmitted through the aperture 130. Additionally, modifying the position of the lens 120 along the optical path 172, i.e. translating the lens 120 in the direction 184, effectively serves to modify the circumference of the return radiation on the front facet of the spectroscopic unit 118. Consequently, a shifting of the lens 120 along the optical path 172 effectively provides a similar effect than modifying the length of the optical path 172. In this way, a three-dimensional tuning or positioning of the spectroscopic detection volume can be effectively realized. Modification of the circumference of the return radiation on the front facet of the spectroscopic unit 118 corresponds to sifting of the spectroscopic detection volume 108 between various focal planes 180 and 182.

Additionally, by vertically moving the objective 106 along the translation direction 184, the length of the optical path inside the spectroscopic system 100 can be arbitrarily modified. This for example allows for a modification of the return radiation's circumference. In this way, the confocal arrangement of the spectroscopic system 100 can be adapted to various focal planes 180, 182.

Figure 7:
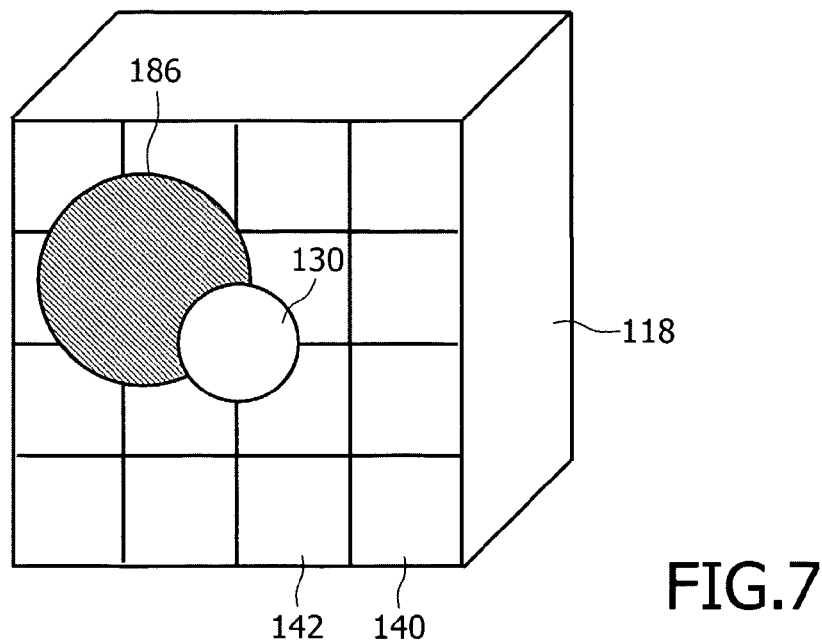

FIG. 7 repeatedly shows an embodiment of an array detector as already illustrated in FIG. 3. Additionally, in FIG. 7 a misaligned confined return radiation beam is illustrated as a detector spot 186. As can be seen from FIG. 7, the detector spot 186 is appreciably larger than the aperture 130. Additionally, the detector spot 186 is transversally shifted with respect to the aperture 130 of the spectrometer 118. When the detector array provides a sufficient number of detection pixels 140, 142 a transverse location of the detector spot 186 as well as its circumference can be precisely determined by means of the detector. Having knowledge of the size and the transverse position deviation, the control unit 128 can sufficiently calculate corresponding control signals for translating and tilting various optical components 120, 114, 112, 106 of the spectroscopic system 100 in order to eliminate the offset in circumference and position of the detector spot 186.

Figure 8:
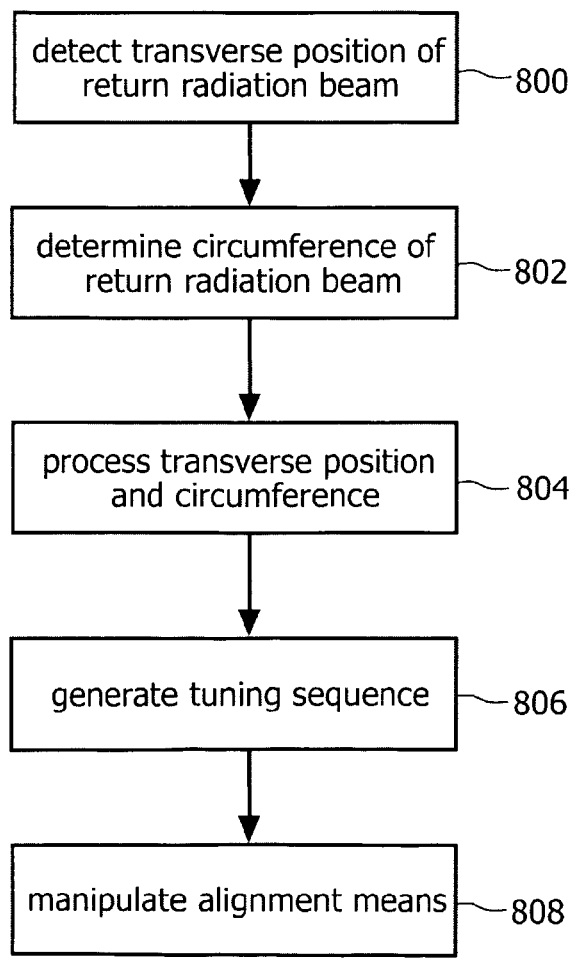
FIG. 8 shows a flow chart for performing a misalignment correction of the spectroscopic system.

FIG. 8 is illustrative of a flow chart of eliminating misalignment of the spectroscopic system 100. In a first step 800, the transverse position of the return radiation beam is detected by means of any of the implemented detectors as illustrated in FIGS. 2-5. Depending on the implementation of the detector, in a successive step 802 also the transverse circumference of the return radiation beam might be determined. Additionally, not only the spatial intensity distribution of the return radiation but also its spectral composition might be analyzed in order to control whether the alignment is performed on the basis of a distinct spectral component of the return radiation. The determination of the circumference can be preferably realized by making use of an array detector providing a sufficient number of detection pixels 140, 142. After determination of the transverse position and/or circumference of the beam of return radiation, the detector output is processed in step 804 in order to calculate a required translation or tilting of respective optical components. Alternatively, prior to such a calculation, the return radiation being incident on the aperture 130 of the spectroscopic unit 118 can be spectrally analyzed which allows to control whether return radiation is within a predefined spectral range. For example, when the spectroscopic system is subject to a severe misalignment, the return radiation may comprise only such spectral components that are irrelevant for the intended spectroscopic analysis. In this way, the calculation to be performed in step 804 can be skipped and an output can be generated indicating that the spectroscopic system requires manual maintenance for instance.

However, in case the return radiation features required spectral components, after processing of the return radiation's transverse position and circumference in step 804, corresponding tuning sequences of electrical signals are generated in step 806. These electrical signals or sequences of electrical signal allow to appropriately translate or tilt optical components of the spectroscopic system, preferably by means of servo driven or Piezo driven actuators. Hence, in the final step 808 the Piezo driven actuators or several elements that allow for modification of the optical path of the return radiation are appropriately manipulated.

Depending on the type of detector the entire tuning of the spectroscopic system can be performed in a single step, when the detector is not only indicative of the type of misalignment but also on the magnitude of misalignment. Additionally, when appropriately calibrated, a position mismatch of e.g. a few micrometers might be compensated by tilting a mirror or beam splitter 112, 114 by a few angular seconds.

Additionally, the invention can be implemented on the basis of a control loop that constantly measures a transverse deviation of the return radiation and that autonomously generates corresponding control signals for Piezo driven actuators for tilting and/or translating optical components of the spectroscopic system.

LIST OF REFERENCE NUMERALS

100 spectroscopic system
102 spectroscopic unit
104 imaging unit
106 objective
108 volume of interest
110 sample
112 beam splitter
114 dichroic mirror
116 laser
118 spectrometer
120 lens
122 excitation beam
124 return radiation
126 imaging radiation
128 control unit
130 aperture
132 detection segment
134 detection segment
136 detection segment
138 detection segment 140 detection pixel
142 detection pixel
150 misalignment fiber
152 misalignment fiber
154 misalignment fiber
156 misalignment fiber
158 misalignment fiber
160 misalignment fiber
162 notch filter
172 optical path
174 tilting direction
176 tilting direction
178 translation direction
180 focal plane
182 focal plane
184 translation direction
186 detector spot

The invention claimed is:

1. A spectroscopic system for determining of a property of a substance in a volume of interest, the spectroscopic system comprising:
    an optical arrangement that focuses an excitation radiation into the volume of interest and collects return radiation from the volume of interest,
    alignment means for directing at least a portion of the return radiation into an aperture of a spectroscopic unit,
    a spatial light detector that detects the transverse position of the return radiation in a transverse plane, the transverse plane comprising the aperture of the spectroscopic unit,
    a control unit that controls the alignment means in response to processing of an output signal of the spatial light detector.

2. The spectroscopic system according to claim 1, wherein the alignment means and the optical arrangement confine the return radiation to a transverse circumference in the transverse plane, the transverse circumference having substantially the same dimension as the aperture of the spectroscopic unit.

3. The spectroscopic system according to claim 1, wherein the aperture of the spectroscopic unit comprises an aperture of an optical fiber, the optical fiber coupling the return radiation into the spectroscopic unit.

4. The spectroscopic system according to claim 1, wherein the alignment means move the position of the aperture of the spectroscopic unit in a plane perpendicular to the direction of propagation of the return radiation.

5. The spectroscopic system according to claim 2, wherein the spatial light detector determines the size of the transverse circumference of the return radiation.

6. The spectroscopic system according to claim 1, wherein the alignment means modifies the length of the optical path between the optical arrangement and the aperture of the spectroscopic unit.

7. The spectroscopic system according to claim 1, wherein the alignment means comprise piezo mechanical elements for tilting and/or translating optical components of the spectroscopic system.

8. The spectroscopic system according to claim 1, wherein the aperture of the spectroscopic unit is implemented into the spatial light detector, the spatial light detector comprising a quadrant detector or a detector array or an arrangement of multiple fibers being arranged around a central fiber serving as the aperture of the spectroscopic unit.

9. The spectroscopic system according to claim 1, further comprising a filter element that at least partially absorbs a spectral component of the return radiation having substantially the same wavelength as the excitation radiation, wherein the filter element is mounted in front of the aperture of the spectroscopic unit.

10. A method of tuning of a spectroscopic system, the spectroscopic system being adapted to determine a property of a substance in a volume of interest and having an optical arrangement for focusing an excitation radiation into the volume of interest and for collecting return radiation from the volume of interest, the method of tuning the spectroscopic system comprising the steps of:
    detecting the transverse position of the return radiation in a transverse plane by means of a spatial light detector, the transverse plane comprising an aperture of a spectroscopic unit,
    controlling alignment means for directing at least a portion of the return radiation into the aperture of the spectroscopic unit if the return radiation's transverse position does not centrally overlap with the aperture of the spectroscopic unit.

11. The method according to claim 10, further comprising the steps of:
    confining the return radiation to a transverse circumference in the transverse plane,
    moving the position of the aperture of the spectroscopic unit in response to detect the transverse position of the confined return radiation non centrally overlapping with the aperture of the spectroscopic unit,
    determining the size of the transverse circumference of the return radiation by means of the spatial light detector,
    modifying the length of the optical path between the optical arrangement and the aperture of the spectroscopic unit if the transverse size does not match the size of the aperture.

12. A computer program product on a computer readable medium for tuning of a spectroscopic system, the spectroscopic system being adapted to determine a property of a substance in a volume of interest and having an optical arrangement for focusing an excitation radiation into the volume of interest and for collecting return radiation from the volume of interest, the computer program product comprising program means being adapted to:
    determine the transverse position of the return radiation in a transverse plane on the basis of an output signal provided by a spatial light detector, the transverse plane comprising an aperture of a spectroscopic unit,
    control alignment means for directing at least a portion of the return radiation into the aperture of the spectroscopic unit if the return radiation's transverse position or circumference does not centrally overlap with the aperture of the spectroscopic unit.

* * * * *